United States Patent [19]

Schuff

[11] 4,290,786
[45] Sep. 22, 1981

[54] APPARATUS FOR REMOVING PARTICULATE MATTER FROM A GAS STREAM

[75] Inventor: Richard W. Schuff, Phoenix, Ariz.
[73] Assignee: Ecotech Corporation, Phoenix, Ariz.
[21] Appl. No.: 113,495
[22] Filed: Jan. 21, 1980

Related U.S. Application Data

[63] Continuation-in-part of Ser. No. 966,096, Dec. 4, 1978, Pat. No. 4,220,478.

[51] Int. Cl.³ .............................................. B03C 3/12
[52] U.S. Cl. ................................. 55/107; 55/126; 55/99; 55/262; 55/474; 55/479; 55/522; 55/DIG. 25; 422/177
[58] Field of Search .................... 55/5, 6, 73, 98, 99, 55/107, 126, 131, 138, 262, 390, 474, 479, 518, 522, DIG. 25; 422/177

[56] References Cited

U.S. PATENT DOCUMENTS

| | | | |
|---|---|---|---|
| 563,709 | 7/1896 | Case | 55/474 |
| 1,895,601 | 1/1933 | Beuthner | 55/474 |
| 2,493,356 | 1/1950 | Mercier et al. | 55/474 |
| 3,920,427 | 11/1975 | Lachuit | 55/479 |
| 3,926,587 | 12/1975 | Squires | 55/479 |
| 3,928,532 | 12/1975 | Squires | 55/73 |
| 3,933,978 | 1/1976 | Margraf | 55/73 |
| 3,998,933 | 12/1976 | Henderson, Jr. et al. | 55/98 |
| 4,017,273 | 4/1977 | Reese | 55/474 |
| 4,061,476 | 12/1977 | Hölter et al. | 55/474 |
| 4,111,755 | 9/1978 | Ban et al. | 55/5 |
| 4,113,447 | 9/1978 | Bennett et al. | 55/5 |
| 4,126,435 | 11/1978 | Reese | 55/474 |
| 4,149,858 | 4/1979 | Noack et al. | 55/390 |
| 4,169,714 | 10/1979 | Calvert | 55/107 |

FOREIGN PATENT DOCUMENTS 2166912  3/1977  Fed. Rep. of Germany .

Primary Examiner—David L. Lacey
Attorney, Agent, or Firm—Cahill, Sutton & Thomas

[57] ABSTRACT

An apparatus for removing particulate matter from a gas stream includes a sorbent injector, a charging antenna, and a plurality of granular media filter cells. The gas stream containing the particulate matter is directed through an inlet plenum. The sorbent injector, located within the inlet plenum, injects fine particles of a sorbent material toward the charging antenna for electrostatically charging the sorbent particles. The charged sorbent particles form a large charged surface area for inducing charges on the particulate matter entrained by the gas stream. The plurality of filter cells each include inner and outer perforated, concentric cylinders, and granular media is caused to move downward between the inner and outer cylinders of each filter cell. The gas stream, including the entrained particulate matter and sorbent particles, flows through the perforations in the inner cylinder into the granular media; the entrained particulate matter and sorbent particles become attached to the granular media as a result of inertial impact forces and electrostatic charges. Clean gas leaves the granular media through the perforations in the outer cylinder.

18 Claims, 6 Drawing Figures

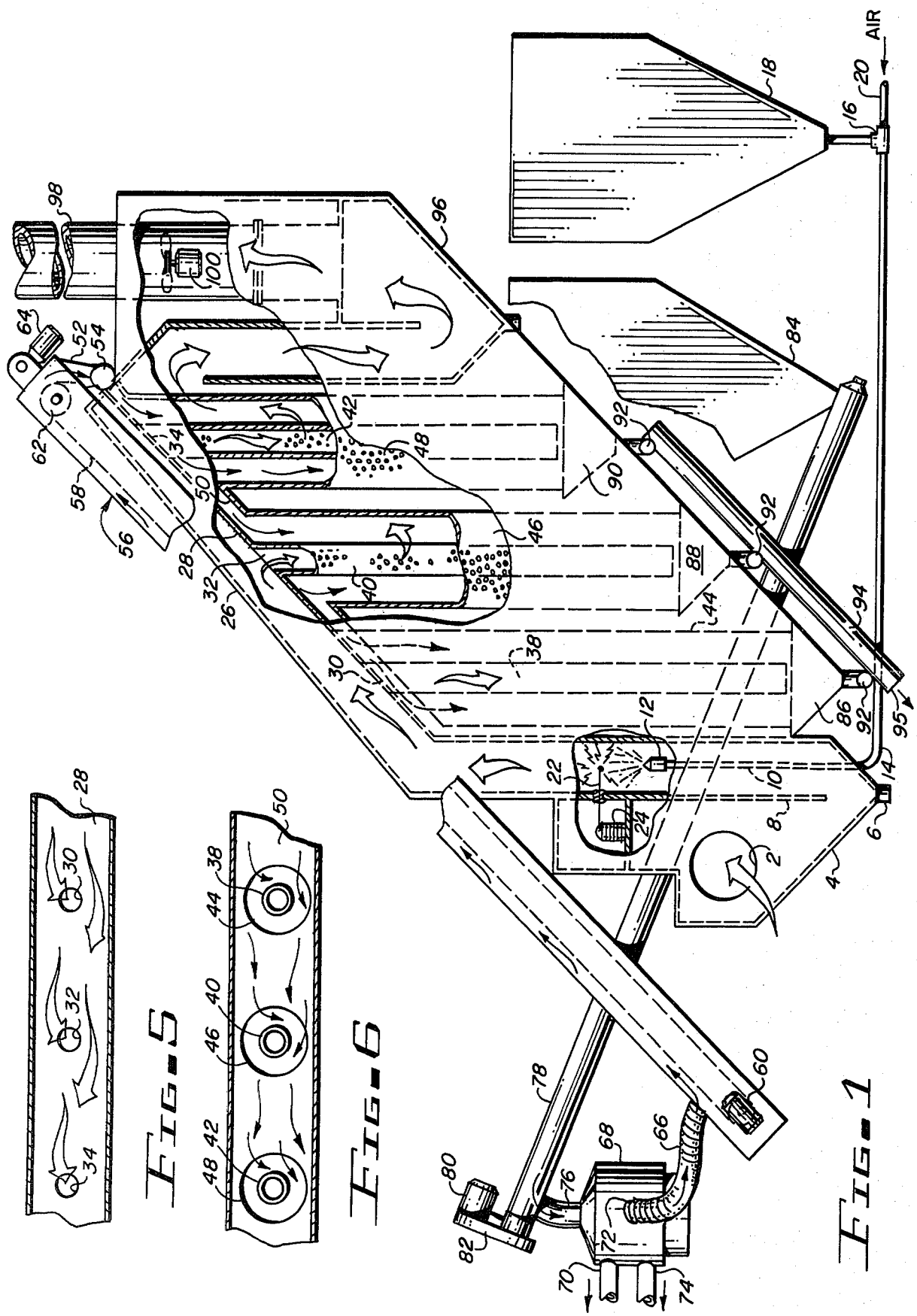

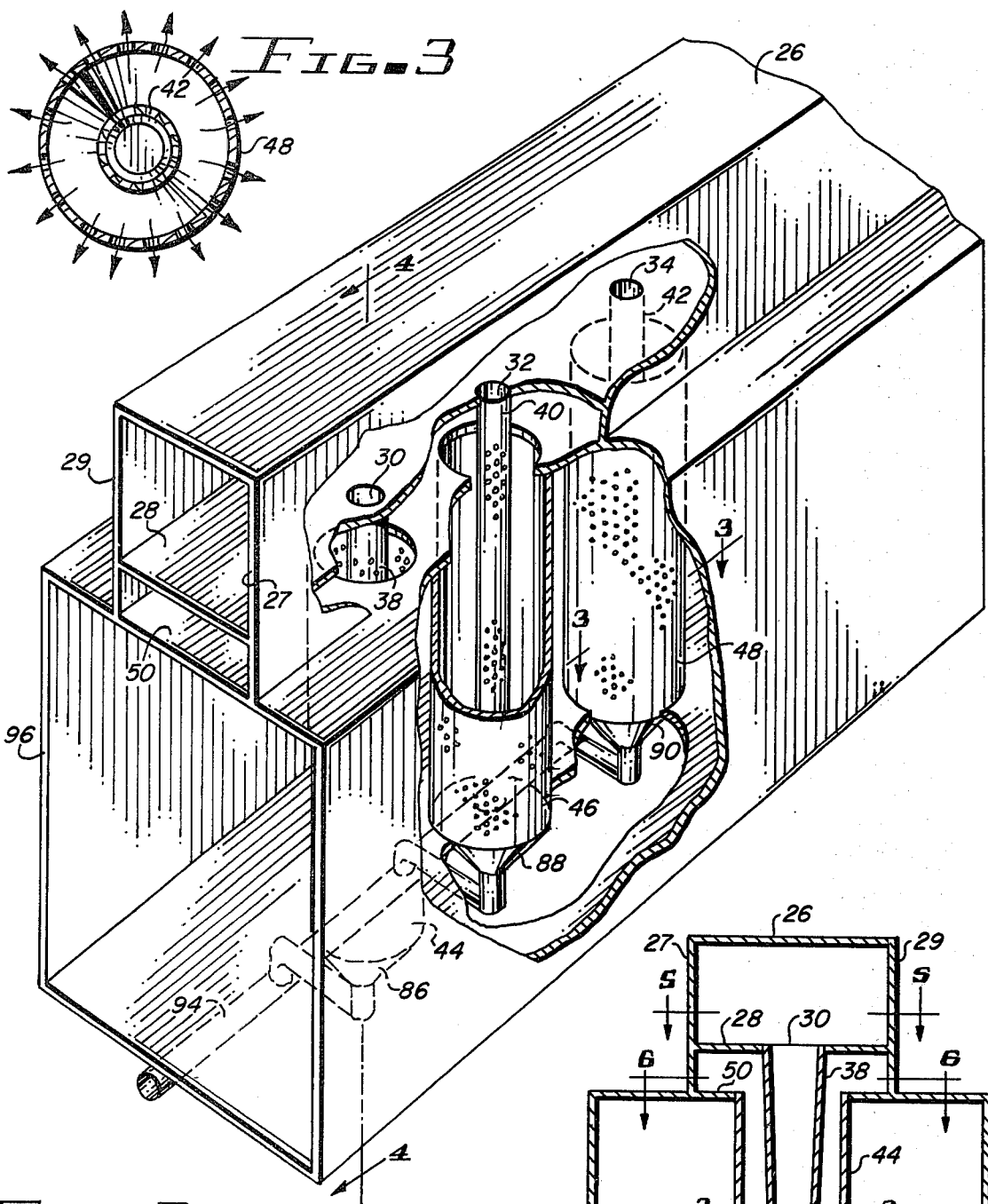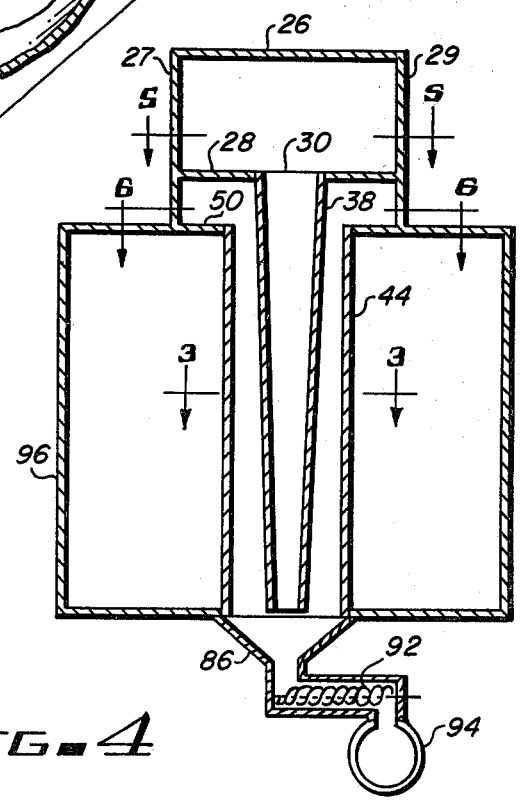

APPARATUS FOR REMOVING PARTICULATE MATTER FROM A GAS STREAM

CROSS REFERENCE TO RELATED APPLICATION

This patent application is a continuation-in-part of copending patent application entitled "Method For Removing Particulate Matter From A Gas Stream And A Method For Producing A Product Using The Removed Particulate Matter", Ser. No. 966,096, filed Dec. 4, 1978 now U.S. Pat. No. 4,220,478, and invented by the inventor of the present invention.

BACKGROUND OF THE INVENTION

1. Field of the Invention

The present invention relates generally to an apparatus for removing particulate matter from a gas stream, and more particularly, to an apparatus for adding electrostatically charged sorbent particles to a gas stream containing particulate matter and directing the gas stream through moving bed granular media filters for removing the entrained particulate matter and sorbent particles from the gas stream.

2. Description of the Prior Art

Air pollution control methods for the removal of fine particulate matter, particularly submicron particles, are not particularly suitable when employed in sizes required for use in large volume processes. The state-of-the-art particulate removal systems experience substantial difficulties attempting to meet strict requirements and regulations imposed by governmental agencies for the removal of such particulate matter. Further, the removal of noxious gases without the accompanying generation of non-disposable wastes also presents significant problems to present industrial gas cleaning systems.

Present fine particulate gas collection systems exhibit poor efficiencies on submicron particle size particulates that must be removed from a gas stream. In those gas streams containing noxious gases such as sulfur dioxide, present systems impose the requirement of a wet or slurry system to remove the noxious gas which therefore exposes the equipment to scaling potential; further, the frequent generation of acid mists when using a wet system creates a difficult collection problem and subjects the equipment to corrosion. The use of fabric filter collectors to capture the particulates presents a fire danger and results in the requirement that temperatures be reduced which may in turn cause temperatures approaching acid dew points. In addition to the approach to acid dew points resulting from the reduced temperature, recoverable heat is lost thereby imposing an additional inefficiency in the process. Such prior art systems also represent extremely high capital costs together with high operation and maintenance costs.

The removal of particulate matter from a gas stream using electrostatic techniques is well known. The use of typical electrostatic techniques combined with systems for the removal of sulfur dioxide are subject to the difficulties described above. Some suggestions have been made regarding the use of granular bed filters for the removal of particulates. See, for example, a discussion of dust deposition published in the *Journal of the Air Pollution Control Association*, volume 28, no. 4, page 354 et. seq., "Dust Deposition and Granular Bed Filters: Theories and Experiments" by G. I. Tardos et al. Suggestion has also been made that such a granular bed be electrified and the gas particles be electrostatically charged such that when the gas containing the particulate matter is passed through the electrified bed the particulate matter adheres thereto. Such electrified bed equipment is discussed in a brochure entitled, *Particulate Control Systems,* published by Electrostatics, Inc. of Woburn, Ma. Regardless of the prior art system that is used, a balance is struck between the thoroughness of collection and the difficulties (and therefore costs) created by the collection system.

In the above mentioned copending application Ser. No. 966,096, which is hereby incorporated by reference, a novel method of removing particulate matter from a gas stream is disclosed; the disclosed method overcomes substantially all of the problems associated with prior art particulate removal systems mentioned above. The above mentioned copending patent application discloses that conventional fluidized-bed electrostatic power coating guns may be used to inject charged sorbent particles into the dirty gas stream for inducing electrostatic charges on the particulate matter entrained by the gas stream. However, in operating plants of the type which emit gas streams containing relatively large amounts of particulate matter (e.g., coke ovens, sinter plants, steel-making furnaces), application of the particulate removal method disclosed by the above mentioned copending patent application would require that sorbent material be injected into the gas stream at the rate of hundreds of pounds per minute. Conventional powder coating guns lack the capacity to inject sorbent material into the gas stream at such a rate.

Accordingly, it is an object of the present invention to provide an apparatus for applying the particulate removal method disclosed by the above mentioned copending patent application to large operating systems such as coke ovens, sinter plants, and steel-making furnaces.

An apparatus for applying the particulate removal method disclosed by the above mentioned copending patent application would typically include an inlet plenum for mixing the injected sorbent material with the gas stream and for directing the gas stream to the granular media filter. If the particulate removal apparatus is used to filter the gas stream emitted from a relatively large operating plant, such as a coke oven, sinter plant, or steel-making furnace, then large quantities of the particulate matter entrained by the gas stream will likely be deposited within the inlet plenum before reaching the granular media filter, thereby restricting the flow of the gas stream and reducing the effectiveness of the particulate removal apparatus.

Accordingly, it is another object of the present invention to provide an apparatus for applying the particulate removal method disclosed by the above mentioned copending patent application while preventing significant amounts of particulate matter from collecting within the inlet plenum.

In addition, an apparatus for applying the particulate removal method disclosed by the above mentioned copending patent application to filter the gas stream of a relatively large operating plant, such as a coke oven, sinter plant or steel-making furnace, would likely include a plurality of granular media filters, as opposed to a singular granular media filter, due to practical limitations in the sizes of materials used to construct such filters. If multiple moving bed granular filters are employed to filter the particulate matter from the gas stream, then granular media must be distributed to each of the filters. Ordinarily, a separate media supply system would be provided for each such filter. However, the addition of a separate media supply system for each filter cell greatly increases the cost of a particulate removal system as the capacity of the system, and correspondingly the number of filters, is increased.

Therefore, it is a further object of the present invention to provide an apparatus for applying the particulate removal method disclosed by the above mentioned copending patent application which uses a single media supply system to supply granular media to multiple granular media filters.

SUMMARY OF THE INVENTION

Briefly, and in accordance with one embodiment thereof, the present invention relates to a particulate removal apparatus which includes a sorbent injector, a charging antenna, and a plurality of moving bed granular media filter cells for collecting particulate matter entrained within a gas stream. The apparatus includes an inlet plenum for receiving the gas stream containing the particulate matter. A sorbent injector, located within the inlet plenum, injects fine particles of a sorbent material toward the charging antenna for electrostatically charging the injected sorbent particles. The charged sorbent particles provide a large charged surface area for inducing charges on the particulate matter entrained within the dirty incoming gas. The gas stream, including the charged particulate matter and sorbent material, is directed upward through an inclined portion of the inlet plenum for distribution to a plurality of granular media filter cells. Particulate matter deposited within the inclined portion of the inlet plenum falls down the incline under the force of gravity to a portion of the inlet plenum where it may be collected and removed. Each of the plurality of filter cells includes inner and outer perforated concentric cylinders, and a granular media is allowed to move downward between the inner and outer cylinders of each filter cell. The inner cylinder of each filter cell communicates with the inclined portion of the inlet plenum, and the gas stream flows through the granular media contained by each of the filter cells. The particulate matter and sorbent material adhere to the granular media and are removed from the gas stream, which exits through the perforations in the outer cylinder of each filter cell. Each of the filter cells communicates with an inclined media distribution channel. The upper end of the inclined media distribution channel is supplied with granular media which falls down the incline under the force of gravity, and the granular media is thereby distributed to each of the plurality of filter cells. Each of the filter cells further includes a discharge screw at its lower end for withdrawing granular media from each filter cell at a predetermined rate.

BRIEF DESCRIPTION OF THE DRAWINGS

FIG. 1 is a side view and partial cross-section of a particulate removal apparatus according to one embodiment of the present invention.

FIG. 2 is a perspective view of a moving bed granular filter portion of the apparatus shown in FIG. 1.

FIG. 3 is a cross-sectional top view of a moving bed granular filter cell taken along lines 3—3, as shown in FIG. 2.

FIG. 4 is a cross-sectional view taken along lines 4—4 as shown in FIG. 2.

FIG. 5 is a cross-sectional view taken along lines 5—5 as shown in FIG. 4.

FIG. 6 is a cross-sectional view taken along lines 6—6 as shown in FIG. 4.

DETAILED DESCRIPTION OF THE PREFERRED EMBODIMENT

In FIG. 1, an apparatus for removing particulate matter from a gas stream includes an entry port 2 through which the gas stream enters the apparatus. The gas stream is directed through an inlet plenum 4. A residue collection port 6 is located at the lowermost point of inlet plenum 4 for withdrawing particulate matter collected within inlet plenum 4. Inlet plenum 4 includes vertically oriented walls 8 and 10 through which the gas stream is upwardly directed. Sorbent injection nozzle 12 is located between walls 8 and 10 for injecting fine particles of a sorbent material into the gas stream. The injected material may be adsorbent or absorbent. Nozzle 12 is coupled by sorbent feed line 14 to venturi fitting 16. A sorbent storage hopper 18 is coupled to venturi fitting 16 for supplying sorbent material, and a pneumatic supply line 20 is also coupled to venturi fitting 16 for pneumatically feeding the sorbent material to nozzle 12.

If the present invention is applied to filter particulate matter from a gas stream emitted by coke ovens, sinter plants or steel-making furnaces, then the sorbent material is preferably fine particles of lime. However, the sorbent material may also be a substance which chemically reacts with the gas stream. For example, if the present invention is applied to filter a gas stream emitted by a coal-fired boiler, the sorbent material may be nacholite which reacts with the sulfur dioxide in the gas stream to form sodium sulfate as explained in the above-mentioned copending patent application.

A high voltage antenna 22 is positioned within inlet plenum 4 directly above nozzle 12. Antenna 22 is charged to approximately 50 kilovolts by high voltage supply 24. Nozzle 12 is positioned to direct the injected sorbent particles toward antenna 22 for electrostatically charging the sorbent particles. Since antenna 22 is located within the inlet plenum 4 external to nozzle 12, some of the particulate matter contained by the gas stream will contact antenna 22 and become electrostatically charged directly by it. In addition, the electrostatically charged sorbent particles mix with the gas stream and provide a large charged surface area or plasma for inducing electrostatic charges on all of the particulate matter contained in the dirty incoming gas stream.

The above-mentioned copending patent application discloses that sorbent particles may be introduced into the gas stream by using conventional fluidized bed-electrostatic powder coating guns such as those manufactured by Nordson Company of Amhurst, Ohio. However, application of the particulate removal method disclosed by the copending application to a large open hearth furnace for making steel or similar large scale operation requires that sorbent particles be added to the gas stream at the rate of hundreds of pounds per minute. This required rate of sorbent particle injection is beyond the capacity of commercial electrostatic powder coating guns presently available. Thus, employment of a high voltage antenna external from the sorbent particle injection nozzle provides for the injection of large quantities of sorbent particles while additionally serving to directly charge a portion of the particulate matter contained within the dirty gas stream.

Still referring to FIG. 1, vertically-oriented walls 8 and 10 of inlet plenum 4 are connected to a top wall 26 and a bottom wall 28, respectively, of an inclined portion of inlet plenum 4. The inclined portion of inlet plenum 4 is also bordered by side walls 27 and 29 (see FIGS. 2 and 4). Bottom wall 28 of the inlined portion of inlet plenum 4 is inclined approximately 45° to a horizontal plane. The dirty gas stream, including the particulate matter and sorbent material, is directed upwardly through the inclined portion of inlet plenum 4. Particulate matter which collects on bottom wall 28 falls down the incline under the force of gravity and can be withdrawn from inlet plenum 4 through residue collection port 6.

Referring now to FIGS. 1 and 2, three holes (designated 30, 32 and 34) are shown in bottom wall 28. The dirty gas stream is directed through holes 30, 32 and 34 and into three corresponding porous moving bed granular filter cells for removing the electrostatically charged particulate matter and sorbent material from the gas stream. The upper ends of perforated metal inner cylinders 38, 40 and 42 are coupled to bottom wall 28 of inlet plenum 4 coincident with holes 30, 32 and 34, respectively. The inner cylinders 38, 40 and 42 are located within perforated metal outer cylinders 44, 46 and 48, respectively. Each of the corresponding inner and outer cylinders is a moving bed granular filter cell. Granular media is passed downwardly through each filter cell between the walls of the inner and outer cylinders as shown by the narrow shaded arrows in FIG. 1. The dirty gas stream is passed through the perforated walls of each inner cylinder and through the bed of granular media; the gas stream escapes through the perforations in the walls of the outer cylinder as shown by the broad unshaded arrows in FIG. 1. As a result of electrostatic and inertial impact forces, the charged particulate matter and charged particles of sorbent material attach themselves to the granular media whereby the particulate matter and sorbent material are removed from the gas stream.

In the preferred embodiment, the perforations in the inner cylinder are circular in shape and measure 5/32 inches in diameter. The number of perforations is sufficient to provide the inner cylinder with a 35% open area through which the gas stream may pass. The perforations in the outer cylinder are also circular in shape and measure ⅛ inches in diameter. The number of perforations in the outer cylinder is sufficient to provide a 40% open area through which the clean gas may escape from the granular media. The diameter of the outer cylinder is roughly three times the diameter of the inner cylinder. Thus, the ratio of the open area in the outer cylinder to the open area in the inner cylinder is roughly 3:1. Consequently, the velocity with which the gas stream passes through the perforations in the inner cylinder is roughly three times as great as the velocity with which the clean gas stream passes through the perforations in the outer cylinder.

The relatively high velocity of the gas stream as it initially enters the granular media filter is desirable because the particulate matter within the gas stream impinges upon the granular media with greater force and adheres more securely to the granular media. The relatively low velocity with which the gas stream exits the granular media is desirable for preventing particulate matter held by the granular media from again becoming entrained within the gas stream as it exits the granular media. However, the ratio of the entrance velocity to the exit velocity is limited in practice by the pressure drop of the gas stream. If the pressure drop becomes substantial, then large and costly exhaust fans are required to exhaust the gas stream from the particulate removal apparatus.

Although only three granular media filter cells are illustrated in the drawings, it should be noted that any number of such filter cells may be used. Similarly, although the filter cells illustrated in the drawings are linearly oriented, identical filter cells could be paralleled with those filter cells already shown in order to form an array or matrix of such filter cells.

The apparatus for distributing the granular media to each of the filter cells will now be described by referring to FIGS. 1, 2, 4 and 6. A granular media distribution channel is formed between bottom wall 50 and the lower surface of bottom wall 28 of inlet plenum 4. The media distribution channel is also bordered by side walls 27 and 29. Inner cylinders 38, 40 and 42 each extend through the media distribution channel for providing access to holes 30, 32 and 34 in bottom wall 28 of inlet plenum 4. The portions of inner cylinders 38, 40 and 42 which extend through the media distribution channel are closed (i.e., not perforated) for preventing the dirty gas stream from passing directly into the media distribution channel. The media distribution channel is inclined, and its upper end is coupled with a media distribution inlet 52. Media inlet 52 includes media distribution screw 54 for regulating the rate at which the granular media enters the media distribution channel. The lower end of the media distribution channel is closed.

Initially, granular media enters the media distribution channel and falls down along inclined bottom wall 50 and into the space between the walls of inner cylinder 38 and outer cylinder 44. When this space becomes filled with granular media, additional granular media entering the media distribution channel falls along inclined bottom wall 50 into the space between inner cylinder 40 and outer cylinder 46 of the next filter cell. After this next filter cell becomes filled with granular media, additional granular media which enters the media distribution channel falls along inclined bottom wall 50 and into the space between inner cylinder 38 and outer cylinder 44 of the last filter cell. Thus, the inclined media distribution channel ensures that granular media is distributed to each of the filter cells.

Granular media is deposited into media inlet 52 by media elevating conveyor 56. Media elevating conveyor 56 includes conveyor belt 58 which extends between idler roller 60 at the lower end of conveyor 56 and drive roller 62 at the upper end of conveyor 56. Drive roller 62 is driven by electric motor 64 for moving conveyor belt 58. Media elevating conveyor 56 serves to elevate granular media from its lower end to its upper end where the granular media falls into media inlet 52.

Sized granular media is supplied to the lower end of media elevating conveyor 56 by supply hose 66. In the preferred embodiment of the present invention, the granular media is sized to be within the range of #7 mesh to #18 mesh. A conventional vibratory screening device 68 may be used to select media of the proper size. Screening device 68 includes an over-size media outlet 70 for removing media sized greater than #7 mesh. Sized media outlet 72 is coupled to supply hose 66 for supplying the properly sized media. Screening device 68 also includes an undersized media outlet 74 for removing media sized less than #18 mesh and accompanying dust.

Raw media supply hose 76 deposits unsized media into the upper portion of screening device 68. Media feed screw conveyor 78 has its upper end connected to supply hose 76 for supplying raw media. Electric motor 80 is connected through gear drive 82 to media feed screw conveyor 78 for rotating the screw. The lower end of media screw conveyor 78 is coupled to raw media storage hopper 84.

The apparatus for withdrawing granular media from each of the filter cells will now be described by referring to FIGS. 1, 2 and 4. The lower ends of outer cylinders 44, 46 and 48 are connected to discharge funnels 86, 88 and 90, respectively. As illustrated in FIG. 4, each of the discharge funnels includes a discharge rate screw 92 for withdrawing granular media from each of the filter cells at a predetermined rate. The lower ends of discharge funnels 86, 88, and 90 are each coupled to media discharge pipe 94 which includes an opening 95 for releasing the discharged granular media to a centralized location.

In order to prevent the granular media from bridging across the walls of the inner and outer cylinders of a filter cell, thereby blocking the flow of granular media within the filter cell, the inner cylinder of each of the filter cells is slightly tapered whereby the diameter of the inner cylinder at its lower end is slightly smaller than at its upper end. Therefore, the distance between the walls of the inner and outer cylinders is slightly larger at the lower end of the filter cell than at its upper end. In FIG. 4, the taper of inner cylinder 38 is exaggerated to make the taper more apparent. Alternatively, inner cylinder 38 could have a uniform diameter while outer cylinder 44 could be tapered to have a slightly larger diameter at its lower end than at its upper end.

The apparatus for exhausting the clean gas stream will now be described by referring to FIGS. 1, 2 and 4. The plurality of filter cells are enclosed within clean gas plenum 96. The clean gas stream which passes through the perforations in each of the outer cylinders is collected by clean gas plenum 96 and directed upward through clean gas exhaust stack 98. Exhaust fan 100 is located within exhaust stack 98 for aiding removal of the clean gas from plenum 96.

The particulate removal apparatus described above may be applied to filter particulate matter from gas streams emitted from coke ovens. Coke is a standard fuel for metalurgical processes and is used to reduce iron ores to pig iron within blast furnaces as well as to reduce pig iron to steel in open hearth or basic oxygen furnaces. Coke is obtained by heating bituminous coal in the absence of air in a coke oven. The heating process distills moisture and volatile hydrocarbons from the coal.

The apparatus described above may be applied to filter the particulate matter entrained within the gases emitted by coke ovens in the following manner. The exhaust of the coke oven is directed into the inlet plenum of the particulate removal apparatus. Fine particles of lime are used as the sorbent material, and screened coke breeze or sinter particles are used as the granular media. The discharged granular media containing the particulate matter removed from the gas stream and the lime sorbent material may then be used either as feedstock for a sinter plant or, if the media discharged by the particulate removal apparatus is low in zinc content, it may be used as feedstock for a blast furnace.

The particulate removal apparatus may also be used to filter the emissions from a sinter plant. Within a sinter plant, metal powders are heated at a temperature below their melting points to form a coherent mass. The heating process causes the fine metal particles to weld together and aglomerate. The raw materials which are fed to the sinter plant include iron ore, scale, coke, limestone, and flue dust. The sinter produced by the sinter plant is used as feedstock for the blast furnace in order to produce pig iron. The exhaust from the sinter plant includes particles of iron oxide and fume.

The described particulate removal apparatus may be used to remove the iron oxide and fume from the sinter plant exhaust in the following manner. The sinter plant exhaust gases are directed into the inlet plenum. Fine particles of lime are used as the sorbent material, and the granular media may consist either of screened coke breeze or sinter particles. The granular media discharged by the particulate removal apparatus may be used as feedstock either for the sinter plant or the blast furnace.

In an open hearth furnace or basic oxygen furnace, pig iron, iron ore, and lime are heated to make steel. The primary particulate emitted by a steel-making furnace (open hearth or basic oxygen) is iron oxide. The described particulate removal apparatus may be used to filter the iron oxide in the gas stream exhausted by steel-making furnaces in a manner identical to that described above for filtering iron oxide particulate matter from the gas stream emitted by the sinter plant.

Thus, it should be appreciated by those skilled in the art that an apparatus for removing particulate matter from a gas stream has been described which may be applied to a wide variety of industrial processes and which is particularly well suited for application to steel production processes. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. An apparatus for removing particulate matter from a gas stream, said apparatus comprising in combination:
   (a) an inlet plenum for conducting the gas stream containing the particulate matter;
   (b) injector means communicating with said inlet plenum for injecting sorbent particles into the gas stream, said injector means injecting the sorbent particles along a predetermined path;
   (c) electrostatic charging means located within said inlet plenum and positioned in the path of the injected sorbent particles for electrostatically charging the injected sorbent particles, the particulate matter contained by the gas stream becoming electrostatically charged either through direct contact with said electrostatic charging means or by mixing with the charged sorbent particles;
   (d) a source of granular media;
   (e) moving bed filter means for receiving granular media and continuously moving the received granular media therethrough, said moving bed filter means communicating with said inlet plenum for directing the gas stream, with the electrostatically charged particulate matter and electrostatically charged sorbent particles therein, through the continuously moving granular media for removing the particulate matter and sorbent particles from the gas stream;

(f) media distributing means coupled to said source of granular media for receiving granular media therefrom and coupled to said moving bed filter means for distributing granular media thereto; and (g) clean gas outlet means coupled to said moving bed filter means for exhausting a cleaned gas stream therefrom.

2. An apparatus as recited in claim 1 wherein said electrostatic charging means comprises a high voltage antenna.

3. An apparatus as recited in claim 2 wherein said injector means comprises:

(a) a nozzle positioned within said inlet plenum;

(b) a supply line coupled between said nozzle and a source of sorbent particles; and (c) a source of pneumatic pressure communicating with said supply line for ejecting sorbent particles from said nozzle.

4. An apparatus as recited in claim 2 wherein said filter means includes an outer container having perforated walls, said filter means also including an inner container having perforated walls positioned within said outer container, said filter means continuously moving the granular media along a path bordered by said inner and outer containers, said inner container communicating with said inlet plenum for directing the gas stream through the perforated walls of said inner container, through the continuously moving granular media, and through the perforated walls of said outer container.

5. An apparatus as recited in claim 4 wherein said outer and inner containers are substantially cylindrical and concentric.

6. An apparatus as recited in claim 5 wherein the diameter of said outer container is approximately three times as large as the diameter of said inner container.

7. An apparatus as recited in claim 5 wherein said filter means has a vertically-oriented longitudinal axis and includes an upper end through which the received granular media enters and a lower end through which the continuously moving granular media exits.

8. An apparatus as recited in claim 7 wherein said inner and outer containers are separated by a first distance at the lower end of said filter means and are separated by a second distance at the upper end of said filter means, the first distance being slightly larger than the second distance for allowing the received granular media to pass freely, under the force of gravity, along the path bordered by said inner and outer containers.

9. An apparatus as recited in claim 7 further including screw feed means connected to the lower end of said filter means for withdrawing granular media from said filter means.

10. An apparatus as recited in claim 1 wherein the injected sorbent particles are lime and wherein the granular media includes coke.

11. An apparatus for removing particulate matter from a gas stream, said apparatus comprising in combination:

(a) an inlet plenum for conducting the gas stream containing the particulate matter, said inlet plenum including a distribution portion;

(b) injector means communicating with said inlet plenum for injecting sorbent particles into the gas stream, said injector means injecting the sorbent particles along a predetermined path;

(c) electrostatic charging means positioned in the path of the injected sorbent particles for electrostatically charging the injected sorbent particles, the particulate matter contained by the gas stream becoming electrostatically charged by mixing with the charged sorbent particles;

(d) a plurality of vertically oriented filter cells each having an upper and lower end, each of said filter cells including an outer container having perforated walls and an inner container having perforated walls, said inner container being positioned within said outer container, said filter cells each continuously moving granular media from the upper end of each filter cell to the lower end of each filter cell along a path bordered by said inner and outer containers;

(e) coupling means for coupling said inner container of each of said filter cells to the distribution portion of said inlet plenum to allow the gas stream, with the particulate matter and sorbent particles therein, to pass through the perforated walls of said inner container, through the moving granular media, and through the perforated walls of said outer container;

(f) clean gas outlet means communicating with said plurality of filter cells for exhausting the gas stream directed through the perforated walls of said inner and outer containers thereof;

(g) a source of granular media; and (h) media distribution means coupled to the upper end of each of said filter cells for distributing the granular media to each of said filter cells, said media distribution means being inclined with respect to a horizontal plane and having an upper end coupled to said source of granular media;

whereby, the granular media falls under the force of gravity through said media distribution means and is distributed to said plurality of filter cells.

12. An apparatus as recited in claim 11 further including screw feeder means coupled to the lower end of each of said filter cells for withdrawing granular media from each of said filter cells at a predetermined rate.

13. An apparatus as recited in claim 11 wherein said inner and outer containers of each of said filter cells are substantially cylindrical and concentric.

14. An apparatus as recited in claim 13 wherein the diameter of said outer container is approximately three times as large as the diameter of said inner container.

15. An apparatus as recited in claim 13 wherein said inner and outer containers are separated by a first distance at the lower end of each of said filter cells and are separated by a second distance at the upper end of each of said filter cells, the first distance being slightly larger than the second distance for allowing granular media to fall freely, under the force of gravity, along the path bordered by said inner and outer containers of each of said filter cells.

16. An apparatus as recited in claim 11 wherein the sorbent particles are lime and wherein the granular media includes coke.

17. An apparatus as recited in claim 11 wherein the distribution portion of said inlet plenum is inclined with respect to a horizontal plane, the distribution portion having a lower end and an upper end, the lower end being closer to said injector means than the upper end, whereby particulate matter deposited within the distribution portion of said inlet plenum falls, under the force of gravity, out of the distribution portion of said inlet plenum, thereby avoiding blockage of the gas stream within the distribution portion of said inlet plenum.

18. An apparatus as recited in claim 17 wherein the distribution portion of said inlet plenum is positioned directly above said media distribution means, said coupling means extending through said media distribution means for coupling said inner container of each of said filter cells to the distribution portion of said inlet plenum.

* * * * *